(12) United States Patent
Dautrey et al.

(10) Patent No.: US 9,045,006 B2
(45) Date of Patent: Jun. 2, 2015

(54) DEVICE INSIDE A TIRE FOR REDUCING ROLLING NOISE

(75) Inventors: Nicolas Dautrey, Chamalieres (FR); Nanae Shimanaka, Ota (JP); Ludovic Greverie, Ota (JP); Salvatore Pagano, Ota (JP)

(73) Assignees: COMPAGNIE GENERALE DES ETABLISSEMENTS MICHELIN, Clemont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1132 days.

(21) Appl. No.: 12/739,465

(22) PCT Filed: Oct. 21, 2008

(86) PCT No.: PCT/EP2008/064196
§ 371 (c)(1),
(2), (4) Date: Aug. 18, 2010

(87) PCT Pub. No.: WO2009/053352
PCT Pub. Date: Apr. 30, 2009

(65) Prior Publication Data
US 2010/0307654 A1 Dec. 9, 2010

(30) Foreign Application Priority Data
Oct. 24, 2007 (FR) ...................................... 07 58543

(51) Int. Cl.
*B60C 5/00* (2006.01)
*B60C 19/00* (2006.01)
(52) U.S. Cl.
CPC ....... *B60C 19/002* (2013.04); *Y10T 152/10495* (2015.01); *B60C 5/00* (2013.01)
(58) Field of Classification Search
CPC .......... B60C 5/00; B60C 19/00; B60C 19/002
USPC ............... 152/153, 155, 157, 450; 156/110.1; 301/6.91
IPC ................................................ B60C 5/00,19/00
See application file for complete search history.

(56) References Cited

U.S. PATENT DOCUMENTS

| 4,399,851 A | 8/1983 | Bschorr |
| 6,343,843 B1 | 2/2002 | Nishikawa |

(Continued)

FOREIGN PATENT DOCUMENTS

| EP | 0 038 920 A1 | 11/1981 |
| EP | 0 691 224 A2 | 1/1996 |

(Continued)

OTHER PUBLICATIONS

English language machine translation of JP2004-082787, 2004.*

(Continued)

*Primary Examiner* — Richard Crispino
*Assistant Examiner* — Philip N Schwartz
(74) *Attorney, Agent, or Firm* — Dickinson Wright PLLC

(57) ABSTRACT

Tire including a crown, sidewalls extending the crown on each side, these sidewalls being connected to beads intended to be in contact with a mounting rim on which the tire is mounted, this tire having an internal wall delimiting, with the mounting rim, an internal cavity to allow the tire to be inflated. This tire includes, over at least part of its internal wall delimiting the internal cavity, a plurality of protrusions of elongate shape forming a dense coating, this tire being characterized in that these protrusions of elongate shape include a plurality of supporting fibers and a plurality of branching fibers, the branching fibers being attached to the supporting fibers, each supporting fiber having two ends, of which at least one is attached to the internal wall of the tire.

8 Claims, 3 Drawing Sheets

(56) References Cited

U.S. PATENT DOCUMENTS

2006/0283659 A1 * 12/2006 Owens et al. .................. 181/207
2008/0116612 A1    5/2008 Dautrey

FOREIGN PATENT DOCUMENTS

| | | | | |
|---|---|---|---|---|
| EP | 1 918 086 | A1 | 5/2008 | |
| JP | 58174619 | A * | 10/1983 | ................ D01F 6/00 |
| JP | 63-291709 | A | 11/1988 | |
| JP | 2004-82787 | A | 3/2004 | |
| JP | 2004082387 | A * | 3/2004 | ............ B29D 30/00 |
| JP | 2006-117115 | A | 5/2006 | |

OTHER PUBLICATIONS

English language machine translation of JP2004-082387, 2004.*
* International Search Report for PCT/EP2008/064196 completed Nov. 21, 2008.

* cited by examiner

DEVICE INSIDE A TIRE FOR REDUCING ROLLING NOISE

The invention relates to tires and in particular to devices for reducing the rolling noise of tires.

In order to reduce the on-vehicle rolling noise of tires, it is known practice in particular to influence the part of the noise that results from the inflation air contained in the cavity delimited by a tire and by its mounting rim being set in vibration (this also being known as the "tire cavity noise"); to this end, it is known practice to provide the interior of the tire (that is to say the part on which the tire inflation pressure is applied) with materials based on foam or fibers.

Patent applications JP2006-117115 or JP2004-082787 describe tire structures in which the internal wall of the tire is coated with a plurality of fibers which form a noise-attenuating coating. Although these solutions do reduce the cavity noise, they also require further refinement. Specifically, implementation of these solutions does not allow high fiber volume densities to be obtained.

It is one objective of the present invention to provide a solution to this problem, that is to say to propose a tire in which the internal cavity of the tire, that is to say the cavity inside which the inflation pressure acts, is provided with fibers with a volume density of coverage of the said cavity, this density of coverage, measured near the wall of the tire delimiting the cavity, being very much higher than the usual densities.

To do this, there is proposed a tire intended for use without an air chamber, this tire comprising a crown provided with a tread intended to come into contact with the road surface during running, sidewalls extending the crown on each side, these sidewalls being connected to beads intended to be in contact with a mounting rim on which the tire is mounted. This tire has an internal wall delimiting, with the mounting rim, an internal cavity to allow the tire to be inflated.

This tire comprises, over at least part of its internal wall delimiting the internal cavity, a plurality of protrusions of elongate shape forming a dense coating, this tire being characterized in that these protrusions of elongate shape comprise a plurality of supporting fibers and a plurality of branching fibers, the said branching fibers being attached to the said supporting fibers, each supporting fiber having two ends, of which at least one is attached to the internal wall of the tire.

By virtue of the tire according to the invention, it is possible to provide the internal wall of a tire with fibers of appropriate length and with a volume density that is also suitable for having a substantially improved effect on the internal cavity noise when the tire is rolling.

According to a first embodiment of the invention, each supporting fiber is provided with one branching fiber, this making it possible to obtain fibers of a length greater than could be obtained with the methods of the prior art.

According to a second embodiment of the invention, each supporting fiber is provided with a plurality of branching fibers so as to obtain a far higher volume density than can be obtained with fibers attached only to the internal wall of the tire.

The supporting fibers and the branching fibers may be chosen from the group consisting of fibers of the following type nylon, PET, acrylic, cotton, flax, wool and rayon fibers.

For preference, the supporting fibers (60) have a length of at least 0.5 mm and at most 10 mm and a diameter ranging between 0.01 mm and 0.5 mm.

For preference, the number of supporting fibers is at least 5 to at most 100 per unit area expressed in $mm^2$.

In order to obtain a satisfactory volume density, it is sensible to provide between 1 and 20 branching fibers per supporting fiber.

For practical purposes, the supporting fibers are applied to the internal wall of the tire delimiting the cavity in which the inflation pressure acts using a flocking process (described notably in the patent document published under the reference EP0691224A2). Likewise, the branchings are formed with branching fibers by using the same type of flocking process. According to the known flocking process, having coated the surface that is intended to receive the supporting fibers, the supporting fibers are then electrostatically deposited by subjecting the supporting fibers and the tread to an electrical field that creates a high potential difference of the order of 10 kV. This same operation is repeated to apply the branching fibers.

The process that has just been described is an effective way of applying a plurality of fibers to the surface of a cavity of any body (notably a tire) so that they occupy a high volume density. To this end, the process according to the invention involves the following steps:

- coating the surface that is intended to receive the strands with an appropriate adhesive;
- electrostatically depositing the supporting strands on the said surface by subjecting the tread to an electrical field that creates a high potential difference;
- coating the supporting strands with an adhesive in order to attach the branching strands;
- electrostatically depositing the branching strands by subjecting the strands and the tread to an electrical field that creates a high potential difference.

It being possible for this last operation to be repeated as many times as required.

In an alternative form of tread according to the invention, the supporting fibers may be made of rubber, it being possible for this material either to be or not to be of the same kind as the inner liner. The branching fibers may be identical to or different from the supporting fibers. In such a case, the supporting or branching fibers have a length ranging from 0.5 mm to 20 mm and have a diameter ranging from 0.5 mm to 5 mm. For preference, the number of supporting fibers per unit area expressed in square millimeters ranges between 0.1 and 5.

Other features and advantages of the invention will emerge from the description given hereinafter with reference to the attached drawings which, by way of nonlimiting example, show some embodiments of the subject matter of the invention.

FIG. 1 shows, in cross section, a tire according to the invention provided on its interior surface with a plurality of supporting fibers to which branching fibers are adhered;

FIG. 2 shows an enlargement of a supporting fiber as used in the alternative form of tire of FIG. 1;

FIG. 3 shows a comparison between the noise levels recorded by various tires, demonstrating the benefit of the tires according to the invention;

FIG. 4 shows an alternative form of protrusions intended to cover the interior of a tire;

FIG. 5 shows the implementation of the flocking process for securing branching strands to the supporting strands in order to lengthen the supporting strands;

FIG. 6 shows the implementation of the flocking process whereby a plurality of branching strands are combined with one supporting strand.

Figure 1:
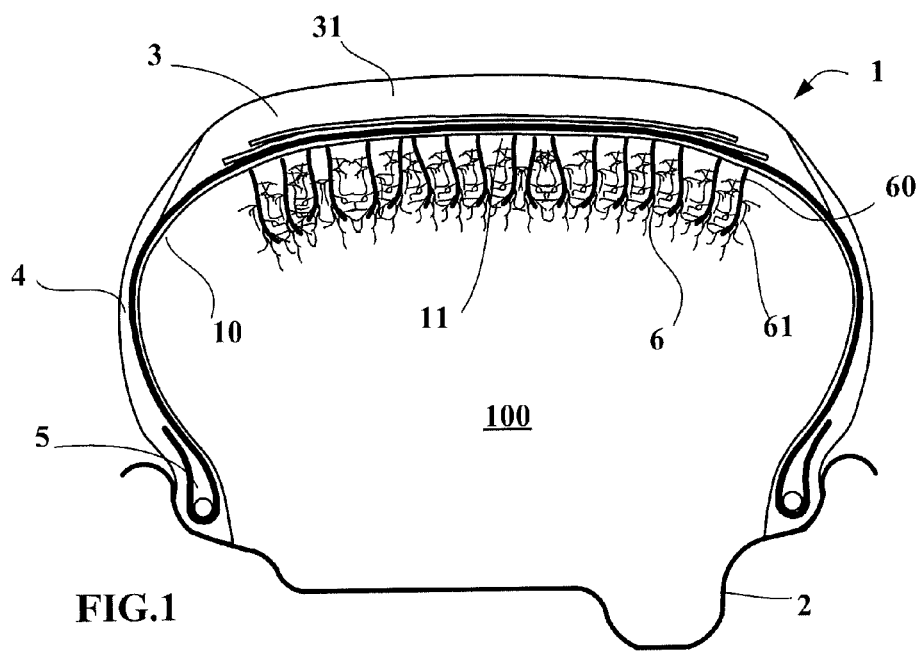
FIG. 1 shows a meridian section through a tire 1 according to the invention (that is to say a section on a plane containing the axis of rotation of the tire) mounted on its mounting rim 2 and inflated to its service pressure.

The tire 1 comprises a crown 3 provided radially on the outside with a tread 31 intended to come into contact with the road surface when the tire is rolling. Axially on each side of this crown 3, the tire comprises sidewalls 4 connecting this crown to beads 5 the purpose of which is to ensure contact with the mounting rim 2. The internal wall 10 of the tire delimits, with the external wall of the mounting rim 2, a cavity 100 intended to receive a gas for inflation to a given pressure corresponding to the service pressure of the tire. To achieve a good seal, the internal wall 10 of the tire 1 is, in the known way, covered with a rubber compound that is gastight in respect of the inflation gas.

The tire 1 according to the invention comprises, on its internal wall 10 and in a limited region 11 corresponding to the crown of the tire, a damping structure to reduce the rolling cavity noise. This structure according to the invention is formed of a plurality of protrusions 6 of elongate shape, these protrusions comprising a plurality of supporting fibers 60 and a plurality of branching fibers 61, the said branching fibers 61 being attached to the supporting fibers 60 or even to other branching fibers.

In this particular instance, the supporting fibers 60 are made of nylon and have an average length of 3 mm. These supporting fibers 60 are attached to the internal wall 10 of the tire by a flocking process that can be described as follows: after an adhesive composition has been deposited on the internal wall of the tire and, more specifically, in the region concerned, this adhesive, the tire and the supporting fibers are subjected to an electrical field that generates a high electrical potential difference between the said fibers and the internal wall of the tire. In this way, the supporting fibers are sprayed onto the internal wall in a determined density. Next, a similar operation is performed between the supporting fibers and the branching fibers which in this instance are chosen to be identical to the supporting fibers. In this last operation and prior to applying the electrical field, a sticky composition is sprayed over the supporting fibers so that the branching fibers can be made to adhere to the said supporting fibers. The mean lengths of the supporting fibers and of the branching fibers are substantially identical and equal to 3 mm. This last operation could even be repeated in order appreciably to increase the volume density of filling/coverage of fibers (whether these be supporting or branching fibers) so as to enhance the effect of damping the vibrations of the inflation air in the cavity during rolling. In the entirely unlimiting example shown, the diameter of the branching fibers is substantially identical to that of the supporting fibers and equal to 50 microns in diameter.

When it is desirable to have a high volume density of branching fibers, it is recommended that branching fibers be chosen that have a cross section appreciably smaller than that of the supporting fibers and that each supporting fiber be made to support from 1 to 10 (or even more) branching fibers. The adhesive-spraying operation and thereafter the formation of the branchings may be repeated after a first set of branching fibers has been applied: in such a case, the new branching fibers branch from the supporting fibers and from the branching fibers already applied.

Although the example described with the support of FIG. 1 shows just part of the profile of the tire coated with the protrusions according to the invention, it is easy to extend the coverage of the internal wall of the tire so that the tire has, from one bead to the other, a coating formed of a plurality of protrusions according to the invention, each protrusion being made up of one supporting fiber to which at least one branching fiber is attached.

Figure 2:
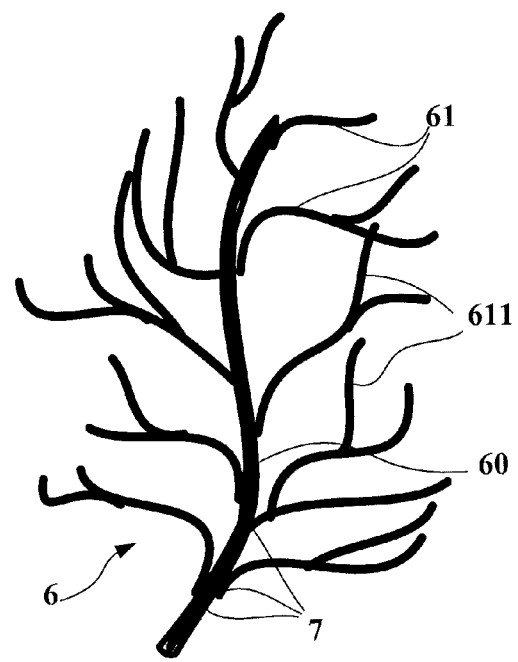

FIG. 2 shows an enlarged view of an elongate protrusion 6 comprising a supporting fiber 60 provided with a plurality of branching points 7 to which branching fibers 61 adhere. It may be seen that points of adhesion or of branching 7 between the branching fibers 61 and the supporting fiber 60 have been formed all along the supporting fiber. In this particular instance, the length of the supporting fibers is greater than that of the branching fibers. Moreover, some branching fibers 61 adhering to the supporting fiber 60 are themselves provided with branching fibers 611 making it possible to increase the volume density of filling with protrusions 6 near the internal wall of the tire.

For preference, the number of supporting fibers per unit area expressed in $mm^2$ is at least equal to 0.1 and more preferably still, greater than 0.5 fibers per $mm^2$.

Figure 3:
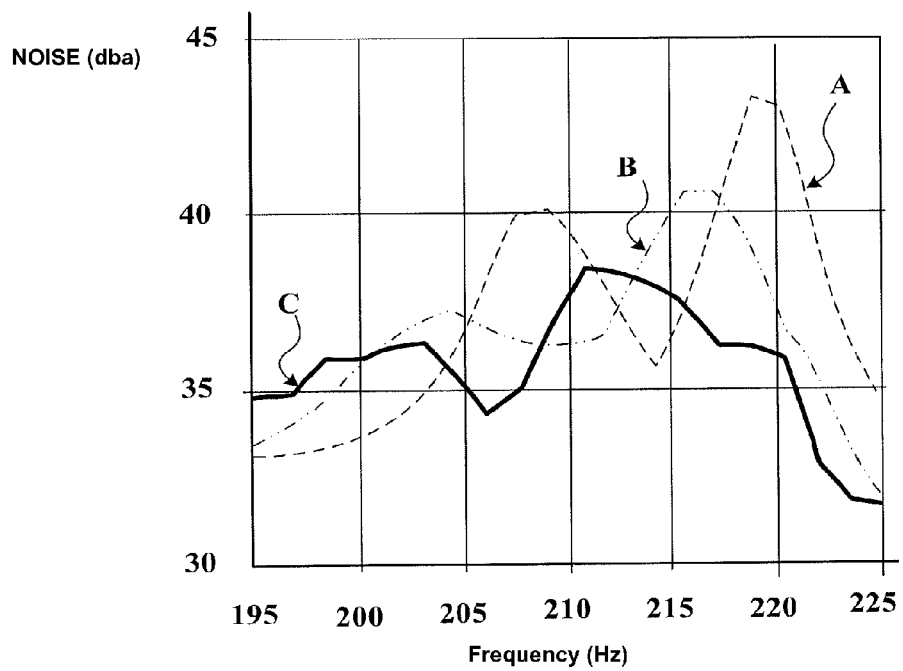

FIG. 3 shows the results of measurements obtained with a tire according to the invention (as shown and described with the support of FIG. 1) compared to a tire coated with unbranched fibers (these fibers corresponding to the supporting fibers of the tire of the invention). The size of the tire is 215/55 R 17. Curve A corresponds to the reference tire of the same size without any coating, curve B corresponds to the tire with unbranched fibers, and, finally, curve C corresponds to the tire according to the invention. The noise inside a vehicle equipped with four identical tires was measured. Running was at a speed of 40 km/h over a road surface that had a surface covering liable to generate cavity noise within the tire. The interior noise was measured inside the vehicle. The frequency peak of 214 Hz corresponds to the cavity noise frequency. The reduction in cavity noise is seen as a reduction in the noise intensity at this frequency:

|  | Improvement over reference tire A (that has no internal covering) |
| --- | --- |
| Tire B | −2.6 dBA |
| Tire C (invention) | −4.9 dBA |

It can be seen that the tire according to the invention provides a 4.9 dBA improvement over the reference tire that has no internal covering and a 2.6 dBA improvement over a tire that has a covering made up of unbranched fibers.

Figure 4:
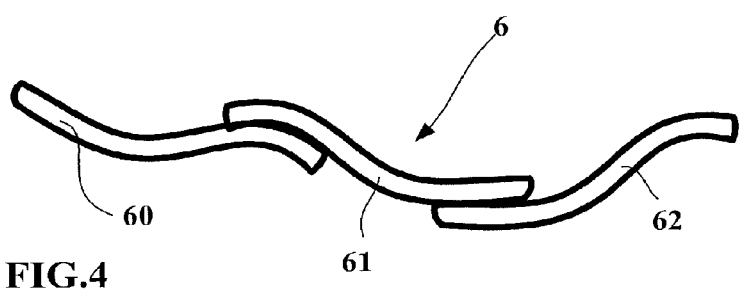

In another embodiment of an elongate protrusion 6, shown in FIG. 4, a supporting fiber 60 is extended by a first branching fiber 61, which is itself extended by a second branching fiber 62. In this embodiment, all the supporting and branching fibers used are identical. Thus, it is possible to obtain a significant length of protrusion by using several times in succession the same process for attaching the (supporting and branching) fibers.

Figure 5:
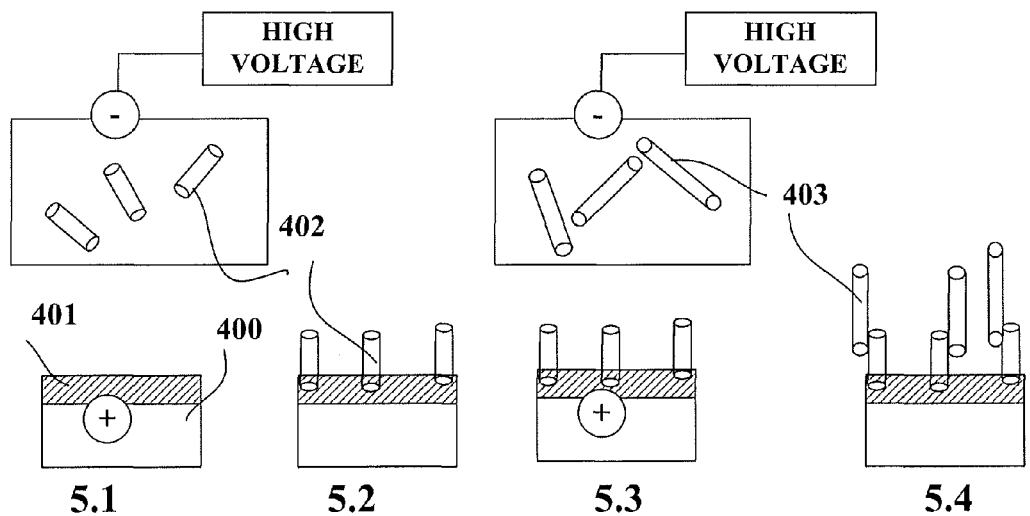

FIG. 5 shows implementation of the flocking process whereby the supporting strands 402 are extended by a branching strand 403 with dimensional characteristics identical to that of the supporting strands. This implementation makes it possible to create protrusions of the kind shown in FIG. 4. First of all, a body 400 is coated on one surface with an adhesive 401 for attaching strands. Supporting strands 402 are subjected to a high negative electrical charge while the body 400 and the adhesive 401 are subjected to a high positive electrical charge (FIG. 5.1). Under the action of these charges, the supporting strands 402 are released and sprayed onto the adhesive-coated surface of the body 400 (FIG. 5.2). The density of supporting strands 402 ranges between 2 and 50 strands per square millimeter of area of the body 400 (inclusive of end point values). In a second step (FIG. 5.3), branching fibers 403 are sprayed onto the supporting fibers in situ on the body 400 by subjecting these branching fibers to a high negative electrical charge while the body 400, the adhesive 401 and the supporting fibers 402 are subjected to a high positive electrical charge. FIG. 5.4 shows the surface of the body 400 covered with supporting strands 402 extended by branching strands 403. The adhesive 401 used for coating the supporting strands 402 and the branching strands 403 with adhesive is an epoxy-type resin or preferably a water-soluble adhesive so as to lessen the increase in rigidity associated with the sticking of the branching strands 403 to the supporting strands 402.

Figure 6:
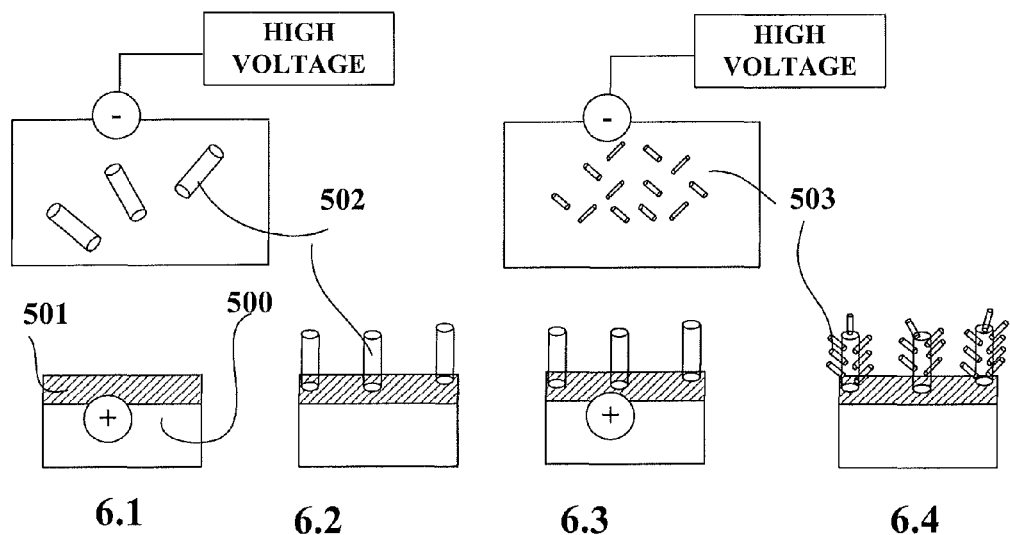

In another embodiment shown in FIG. 6, use is made of the same supporting strands 502 as were used in the description of the embodiment shown in FIG. 5. A first step (FIGS. 6.1 and 6.2) applies supporting strands 402 to an adhesive-coated surface 501 of a body 500 in the same way. In a second step (FIG. 6.3) a collection of branching fibers 503 which are smaller in size than the supporting strands are negatively charged. Through this operation, a plurality of branching strands 503 can be attached to each supporting strands 502 as shown in FIG. 6.4.

The invention is not restricted to the examples described and depicted and various modifications can be made thereto without in any way departing from its scope. The cavities formed on the tread (grooves, incisions) may also be provided with the same type of elongate protrusions formed of at least one supporting fiber to which at least one branching fiber is attached.

Moreover, the fibers described hitherto have had a circular or substantially circular cross section: the invention is not in any way restricted to this specific shape and any other shape can be employed in an equivalent way.

Finally, the embodiment described hitherto has been one in which the supporting fibers are attached directly to the internal wall of the tire, with the branching fibers being attached to these supporting fibers in a second step according to the process described in this document. It may prove more convenient, depending on the size of the tire for example, for a covering material to be formed independently of the tire by covering a sheet of a suitable material with supporting fibers themselves supporting branching fibers. This covering material can then be fitted against the internal wall of the tire or of the wheel, for example attaching it by adhesive bonding.

The invention claimed is:

1. A tire intended for use without an air chamber, this tire comprising:
    a crown provided with a tread intended to come into contact with the road surface during running,
    sidewalls extending the crown on each side, these sidewalls being connected to beads intended to be in contact with a mounting rim on which the tire is mounted,
    an internal wall delimiting, with the mounting rim, an internal cavity to allow the tire to be inflated,
    a plurality of protrusions of elongate shape forming a dense coating over at least part of the internal wall delimiting the internal cavity, comprising:
    a plurality of supporting fibers, each having two ends, one of which is attached to the internal of the tire, and
    a plurality of branching fibers, attached to the supporting fibers.

2. The tire according to claim 1, wherein the supporting fibers and the branching fibers are chosen from the group consisting of nylon, PET, acrylic, cotton, flax, wool and rayon fibers.

3. The tire according to claim 2, wherein the supporting fibers have a length of at least 0.5 mm and at most 10 mm and a diameter ranging between 0.01 mm and 0.5 mm.

4. The tire according to claim 1, wherein the number of supporting fibers is at least 5 to 100 per unit area expressed in $mm^2$.

5. The tire according to claim 1, wherein the number of branching fibers attached to one supporting fiber is at least 1 and at most 20.

6. The tire according to claim 5, wherein the branching fibers have been attached to the supporting fibers by a "flocking" process, and wherein the supporting fibers have been attached to the internal wall by a "flocking" process, thereby increasing the volume density of the supporting fibers and the branching fibers.

7. The tire according to claim 1, wherein that the entirety of the internal wall of the tire is provided with protrusions of elongate shape, each protrusion being made up of a supporting fiber to which at least one branching fiber is attached.

8. The tire according to claim 1, wherein the supporting fibers and the branching fibers are made of rubber.

* * * * *